(12) United States Patent
Liao

(10) Patent No.: US 9,269,019 B2
(45) Date of Patent: Feb. 23, 2016

(54) IMAGE IDENTIFICATION METHOD, ELECTRONIC DEVICE, AND COMPUTER PROGRAM PRODUCT

(71) Applicant: Wistron Corporation, New Taipei (TW)

(72) Inventor: Po-Hsuan Liao, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 132 days.

(21) Appl. No.: 14/048,104

(22) Filed: Oct. 8, 2013

(65) Prior Publication Data

US 2014/0219557 A1  Aug. 7, 2014

(30) Foreign Application Priority Data

Feb. 4, 2013  (TW) .............................. 102104154 A

(51) Int. Cl.
  *G06K 9/00*  (2006.01)
  *G06K 9/46*  (2006.01)
  *G06T 7/40*  (2006.01)

(52) U.S. Cl.
  CPC ............ *G06K 9/4652* (2013.01); *G06K 9/4642* (2013.01); *G06T 7/401* (2013.01); *G06T 7/408* (2013.01)

(58) Field of Classification Search
  CPC ................ G06F 3/017; G06T 17/3025; G06T 17/30262; G06T 17/30256; G06T 17/30259; G06T 7/408; G06T 7/0022; G06T 7/401; G06T 2207/20021; G06T 2207/20144; G06K 9/626; G06K 9/4652; G06K 9/4642; G06K 9/00624; Y10S 707/99932; Y10S 707/99933; Y10S 707/99936; Y10S 707/99945
  USPC .......................................................... 382/165
  See application file for complete search history.

(56) References Cited

U.S. PATENT DOCUMENTS

| 6,411,953 B1 * | 6/2002 | Ganapathy .......... G06F 17/3025 |
| 8,064,707 B2 * | 11/2011 | Chiang ................ G06K 9/4642 |
| | | 382/207 |
| 2005/0248789 A1 * | 11/2005 | Kita .................... G03G 15/5062 |
| | | 358/1.9 |

(Continued)

FOREIGN PATENT DOCUMENTS

| EP | 2257072 A1 | 12/2010 |
| TW | 200903349 A | 1/2009 |

OTHER PUBLICATIONS

TW Office Action dated Sep. 30, 2014.

(Continued)

*Primary Examiner* — Ali Bayat
(74) *Attorney, Agent, or Firm* — McClure, Qualey & Rodack, LLP

(57) ABSTRACT

An image identification method, an electronic device with image identification function and a computer program product executing the image identification method with a software program are provided. The image identification method comprises steps of: proceeding texture feature extraction on a color source image to obtain a plurality of texture parameters; proceeding color feature extraction on a color source image to obtain a plurality of color momentums; and weighting the plurality of texture parameters and the plurality of color momentums to obtain an image identification parameter corresponding to the color source image.

22 Claims, 12 Drawing Sheets

(56) References Cited

U.S. PATENT DOCUMENTS

2008/0144946 A1* 6/2008 Naccari .................. G06K 9/38
382/225
2010/0061628 A1* 3/2010 Yamada ............... G06T 7/0081
382/167

OTHER PUBLICATIONS

Paschos, et al.: "Image Content-Based Retrieval Using Chromaticity Moments"; IEEE Transactions on Knowledge and Data Engineering, vol. 15, No. 5,; Sep./Oct. 2003; pp. 1069-1072.

* cited by examiner

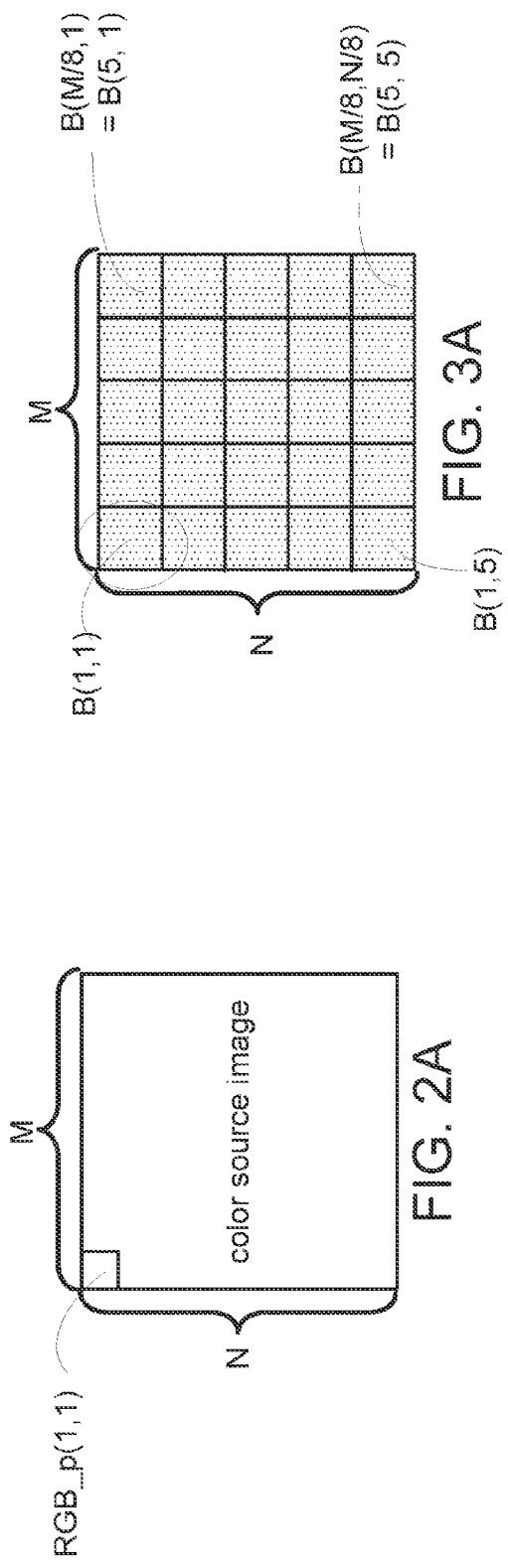
FIG. 3A
FIG. 2A
FIG. 2B
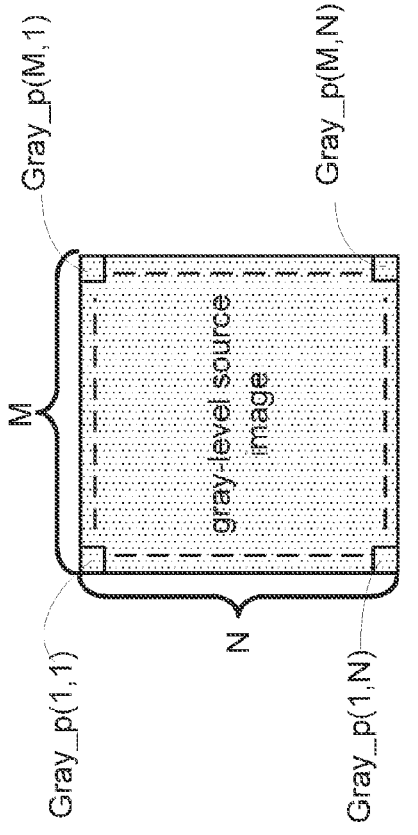
FIG. 3B

IMAGE IDENTIFICATION METHOD, ELECTRONIC DEVICE, AND COMPUTER PROGRAM PRODUCT

This application claims the benefit of Taiwan application Serial No. 102104154, filed Feb. 4, 2013, the subject matter of which is incorporated herein by reference.

BACKGROUND OF THE INVENTION

1. Field of the Invention

The invention relates in general to an image identification method, an electronic device and a computer program product, and more particularly to an image identification method, an electronic device and a computer program product, in which determination is made according to texture and color attributes 2. Description of the Related Art Along with the popularity of the Internet, the search engine which enables the user to quickly find needed information is getting more and more important. Most search engines only provide text search function which searches relevant articles in the Internet according to the words inputted by the user.

Nowadays, digital images occupy a considerable percentage of Internet information such as shopping websites, news websites, or product introduction. There is an increasing demand for image search function in addition to the conventional text search function. The image search function searches relevant articles in the Internet according to the content of image.

Although some search engines provide image search function, the technology used for search images is still based on text search. That is, the user must firstly input key words. Then, relevant images are searched according to the texts. Such approach does not really search images in the database or the Internet but provides metadata for each image. Through the metadata, descriptions or key words are provided with respect to the content of each image. Then, when the user wishes to search an image, the search engine will search the images according to the text content of the metadata.

In other words, the pre-requisite for image search using metadata is that the interpretation process must be performed on contents of image database to obtain the metadata used as a determination basis for image search.

If the user wishes to use the images on hand as a search basis to obtain corresponding images through a search engine, the conventional image search method based on the metadata cannot be used for searching images.

Therefore, it is essential to provide a search method capable of directly searching similar images from the image database.

SUMMARY OF THE INVENTION

According to one embodiment of the present invention, an image identification method is provided. The image identification method comprising steps of: proceeding texture feature extraction on a color source image to obtain a plurality of texture parameters; proceeding color feature extraction on the color source image to obtain a plurality of color momentums; and, weighting the plurality of texture parameters and the plurality of color momentums to obtain an image identification parameter corresponding to the color source image.

According to another embodiment of the present invention, an electronic device with image identification function is provided. The electronic device comprises a storage unit, a texture determination unit, a color determination unit, and an identification unit. The storage unit stores a color source image. The texture determination unit is electrically connected to the storage unit for proceeding texture feature extraction on the color source image to obtain a plurality of texture parameters. The color determination unit is electrically connected to the storage unit for proceeding texture feature extraction on the color source image to obtain a plurality of color momentums. The identification unit is electrically connected to the texture determination unit and the color determination unit for weighting the plurality of texture parameters and the plurality of color momentums to obtain an image identification parameter corresponding to the color source image.

According to an alternate embodiment of the present invention, a computer program product storing a software program is provided. When the software program is executed, an electronic device with a controller performs an image identification method. The image identification method comprises steps of: proceeding texture feature extraction on a color source image to obtain a plurality of texture parameters; proceeding color feature extraction on the color source image to obtain a plurality of color momentums; and, weighting the plurality of texture parameters and the plurality of color momentums to obtain an image identification parameter corresponding to the color source image.

According to another alternate embodiment of the present invention, an image identification method is provided. The image identification method comprises steps of: proceeding texture feature extraction on a first color source image and a second color source image respectively to obtain a plurality of first texture parameters and a plurality of second texture parameters; weighting the plurality of first texture parameters and the plurality of second texture parameters respectively to obtain a first texture identification parameter and a second texture identification parameter corresponding to the first color source image and the second color source image; and, identifying degree of similarity between the first color source image and the second color source image according to the first texture identification parameter and the second texture identification parameter.

According to another alternate embodiment of the present invention, an image identification method is provided. The image identification method comprises steps of: proceeding color feature extraction on a first color source image and a second color source image to obtain a plurality of first color momentums and a plurality of second color momentums; weighting the plurality of first color momentums and the plurality of second color momentums respectively to obtain a first color identification parameter and a second color identification parameter corresponding to the first color source image and the second color source image; and, identifying degree of similarity between the first color source image and the second color source image according to the first color identification parameter and the second color identification parameter.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 2A is a schematic diagram illustrating a color source image represented by a prime color representation method;

FIG. 2B is a schematic diagram illustrating a color source image converted into a gray-level source image;

FIG. 3A is a schematic diagram illustrating a gray-level source image divided into a plurality of gray-level blocks;

FIG. 3B is a schematic diagram illustrating discrete cosine transformation performed on a gray-level block according to an embodiment of the present invention;

DETAILED DESCRIPTION OF THE INVENTION

Since the conventional image search technology is based on metadata, the search engine cannot effectively provide content-based image retrieval (hereinafter, CBIR) function. Thus, the present invention provides an image search method in which determination is based on texture and color attributes of image.

Figure 1:
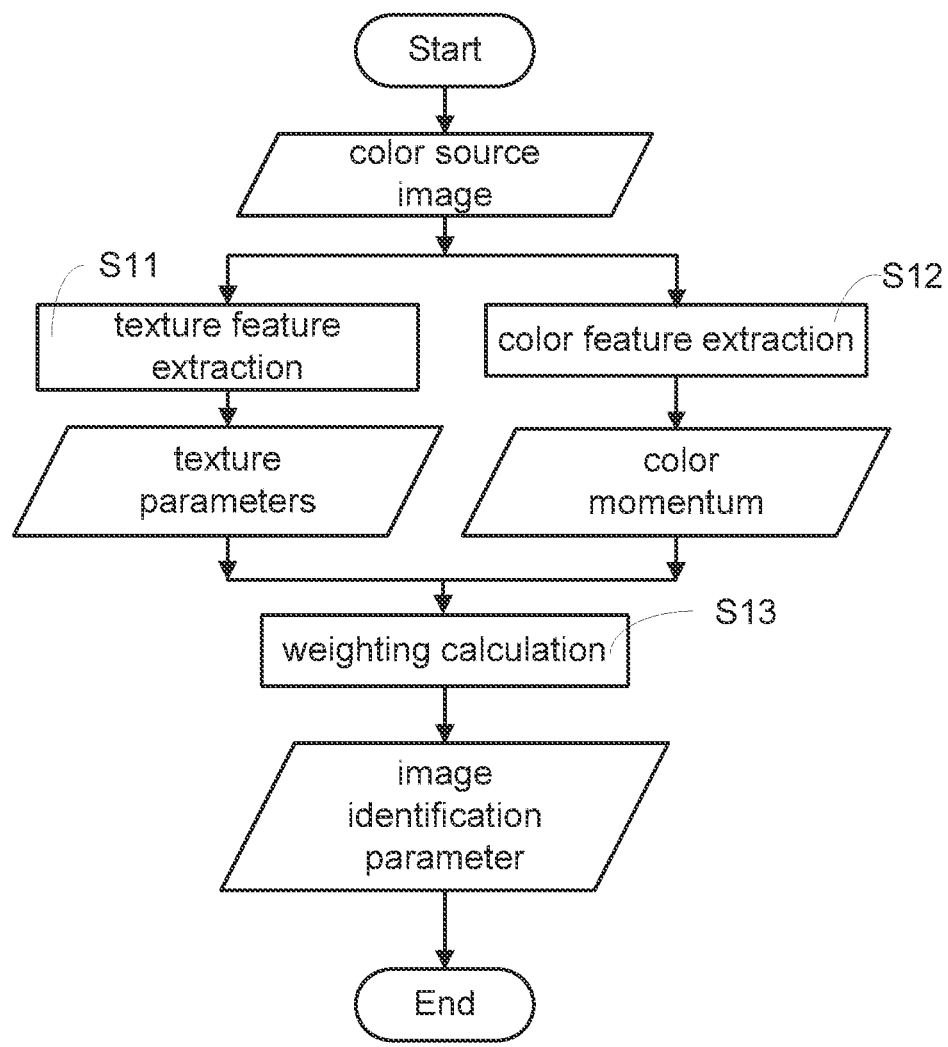
FIG. 1 is an identification flowchart for a color source image according to an embodiment of the present invention.

FIG. 1 is an identification flowchart for a color source image according to an embodiment of the present invention.

In step S11 (the left-hand side branch of the flowchart), texture feature extraction is proceeded on a color source image to obtain a plurality of texture parameters. In step S12 (the right-hand side branch of the flowchart), color feature extraction is proceeded on the color source image to obtain a plurality of color momentums.

In step S13, a texture identification parameter $F_{texture}$ composed of texture parameters and a color identification parameter $F_{color}$ composed of color momentums are weighted to obtain an image identification parameter $F_{pic}$ corresponding to the color source image.

In the image identification method of the present invention as disclosed above, the texture identification parameter $F_{texture}$ representing the texture features of the image is generated in step S11 and the color identification parameter $F_{color}$ representing the color features of the image is generated in step S12. The two steps can be performed concurrently or sequentially.

Furthermore, when the database contains a plurality of color source images and the color source images are processed according to the flowchart as shown in FIG. 1, image identification parameters corresponding to each color source image are provided.

Suppose a to-be-tested image is a color source image A. The identification process as shown in FIG. 1 is performed on the color source image A to obtain an image identification parameter $F_{pic-A}$ corresponding to the color source image A.

Then, the image identification parameter $F_{pic-A}$ is compared with a plurality of image identification parameters pre-stored in the database. Among the pre-stored image identification parameters, the image identification parameter closest to the image identification parameter $F_{pic-A}$ is selected. Of the database, the color source image corresponding to the selected image identification parameter is most similar to the color source image A.

The identification process of the present invention can be divided into two aspects of determination. In one aspect, the texture features are used as a determination basis in image identification. In another aspect, the color features are used as a determination basis in image identification. The invention combines the two aspects of determination and generates an image identification parameter corresponding to the color source image through weighting calculation. The two aspects of determination are disclosed below. In practical application, the two aspects can be separately used for determining degree of similarity between images.

Firstly, how the present invention uses texture features of image as a determination basis in image identification is elaborated below. A set of texture matrixes representing different texture features of an image are calculated in image processing designed to quantify the perceived texture of an image. For example, hair line, cloth stripe pattern and bamboo forest in an image provide different texture features. Here, the texture features corresponding to the source image can be divided into smooth texture feature, vertical texture feature, horizontal texture feature, and slashed texture feature.

FIG. 2A is a schematic diagram illustrating a color source image represented by a prime color representation method. A color source image includes M×N color pixels. For convenience of elaboration, it is assumed that M=N=40, but the practical application is not limited thereto. That is, resolution and size of an image can be freely adjusted by anyone who is skilled in the technology field of the present invention.

The M×N color pixels contained in the color source image correspond to a first prime color value (R, which represents a red value), a second prime color value (G, which represents a green value) and a third prime color value (B, which represents a blue value) respectively.

In the present embodiment, gray-level transformation is respectively performed on 40×40=1,600 color pixels to obtain 1,600 gray-level pixels. Gray-level transformation is performed on the prime color values (R, G, B) corresponding to each color pixel to obtain a gray level corresponding to the gray-level pixel.

Let a pixel p(1,1) at a first row and a first column, be taken for example. Gray-level transformation is performed on the pixel p(1,1) originally corresponding to a prime color value RGB_p(1,1) to obtain a gray level Gray_p(1,1).

The gray-level transformation equation as shown in Equation 1 converts the color pixels contained in the color source image to a plurality of corresponding gray-level pixels respectively.

The gray level of a gray-level pixel is expressed in Equation 1.

The gray level of a gray-level pixel $$=0.299*(R)+0.587*(G)+0.114*(B) \quad \text{(Equation 1)}$$

Equation 1 defines converting weight of first prime color (such as 0.299) corresponding to the first prime color value (R), converting weight of second prime color (such as 0.587) corresponding to the second prime color value (G), and converting weight of third prime color (such as 0.114) corresponding to the third prime color value (B).

Here, the gray level corresponding to gray-level pixel is a summation of a product of the first prime color value and the converting weight of first prime color, a product of the second prime color value and the converting weight of second prime color, and a product of the third prime color value and the converting weight of third prime color.

To transform the M×N color pixels into M×N gray-level pixels is equivalent to converting the color source image as shown in FIG. 2A into the gray-level source image as shown in FIG. 2B.

FIG. 2B is a schematic diagram illustrating a color source image converted into a gray-level source image.

There is a one-to-one correspondence relationship between the gray-level pixels of FIG. 2B and the color pixels of FIG. 2A. That is, the color pixel RGB_p(1,1) at the first row and the first column of FIG. 2A is converted to generate the gray level of the gray-level pixel Gray_p(1,1) at the first row and the first column of FIG. 2B.

The gray-level image is divided into a plurality of gray-level blocks.

FIG. 3A is a schematic diagram illustrating a gray-level source image divided into a plurality of gray-level blocks. The number of pixels contained in each of the at least one gray-level block is determined according to format of discrete cosine transformation. For instance, let a gray-level block with 8×8 pixels be the basic unit of discrete cosine transformation. The image area is divided into a plurality of gray-level blocks each being composed of 8×8 pixels. Given that M=N=40, the image as shown in FIG. 3A can be divided into 5×5 gray-level blocks.

That is, both the number of gray-level blocks and the number of pixels contained in each of the gray-level block are determined according to the size of the color source image and format (basic unit) of discrete cosine transformation.

FIG. 3B is a schematic diagram illustrating discrete cosine transformation performed on a gray-level block according to an embodiment of the present invention. The present embodiment is equivalent to performing discrete cosine transformation (hereinafter, DCT) on 5×5=25 gray-level blocks respectively for converting the gray-level image into a frequency domain.

During discrete cosine transformation, each gray-level block corresponds to a block transformation matrix. For instance, the gray-level block at the first row and the first column is converted into the block transformation matrix at the first row and the first column.

Figure 4:
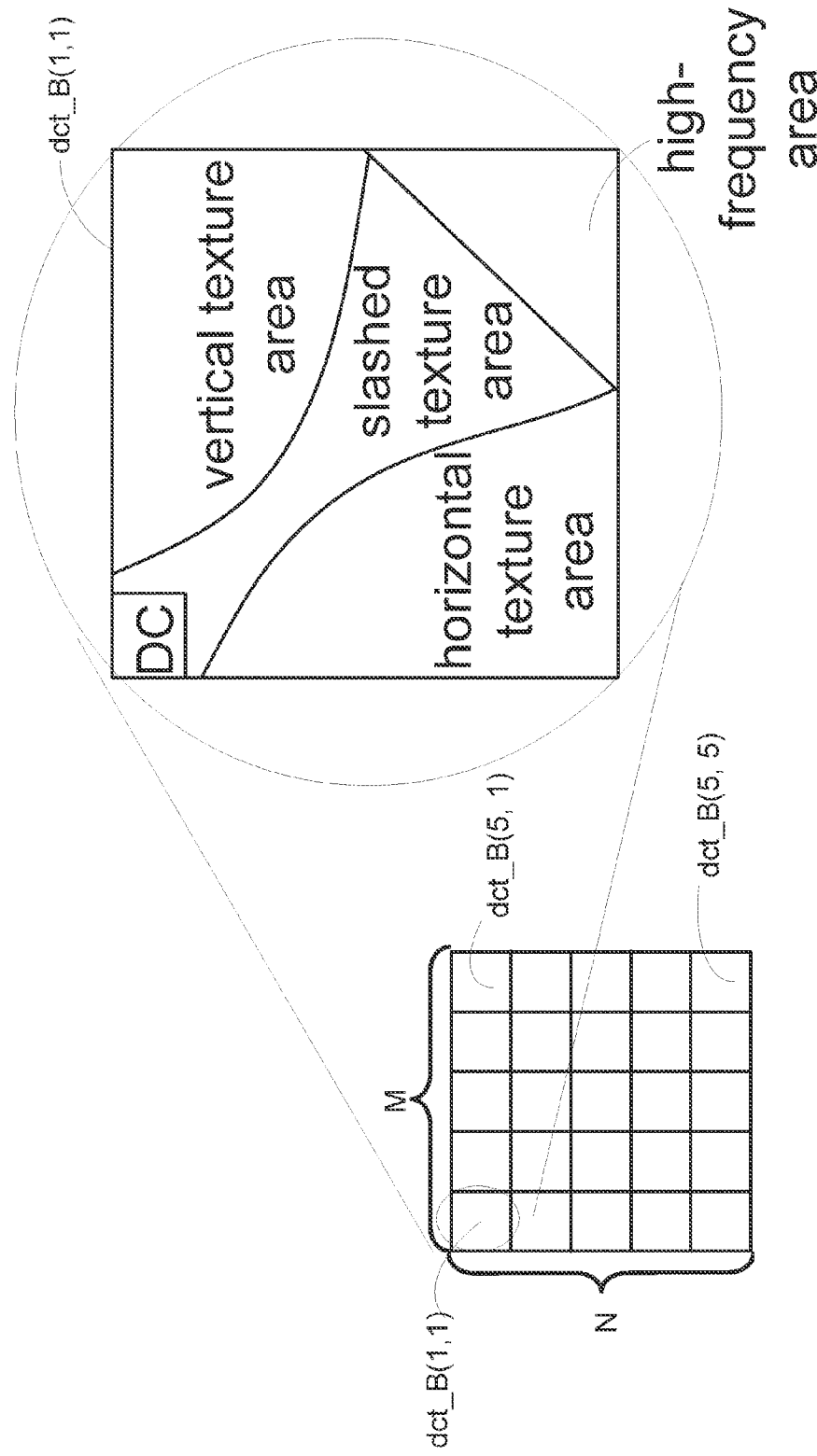
FIG. 4 is a schematic diagram illustrating a block transformation matrix correspondingly obtained from a gray-level block after discrete cosine transformation is performed on a gray-level source image.

FIG. 4 is a schematic diagram illustrating a block transformation matrix correspondingly obtained from a gray-level block after discrete cosine transformation is performed on a gray-level source image. FIG. 4 shows that 5×5 block transformation matrixes are correspondingly obtained after discrete cosine transformation is performed on the 5×5 gray-level blocks contained in the gray-level source image.

As indicated in FIG. 4, the converting values contained in each block transformation matrix can be divided into different areas according to corresponding positions of the converting values. Let the enlarged block transformation matrix dct_B(1,1) at the first row and the first column be taken for example. The block transformation matrix dct_B(1,1) can be divided into a smooth texture area, a vertical texture area, a horizontal texture area, a slashed texture area, and a high-frequency area.

After discrete cosine transformation is performed on an image, the converting values at different positions of the frequency domain of the image can be used to indicate intensity and direction of the texture of the source image.

When the smooth texture area (DC) at the top-left corner of the block transformation matrix has a large converting value, this implies that the color source image is mostly composed of smooth area.

When the vertical texture area at the top-right corner of the block transformation matrix has a large converting value, this implies that most areas of the color source image have vertical distribution. For instance, the content of the color source image is a bamboo forest.

When the horizontal texture area at the bottom-left corner of the block transformation matrix has a large converting value, this implies that most areas of the color source image have horizontal distribution. For instance, the color source image illustrates people in prison jumpsuits.

When the slashed texture area at the middle of the block transformation matrix has a large converting value, this implies that most areas of the color source image have slashed stripes. For instance, the color source image is an image of rainfall.

When discrete cosine transformation is performed on an ordinary image, the high-frequency area at the bottom-right corner of the block transformation matrix is very small and can thus be neglected.

Figure 5A:
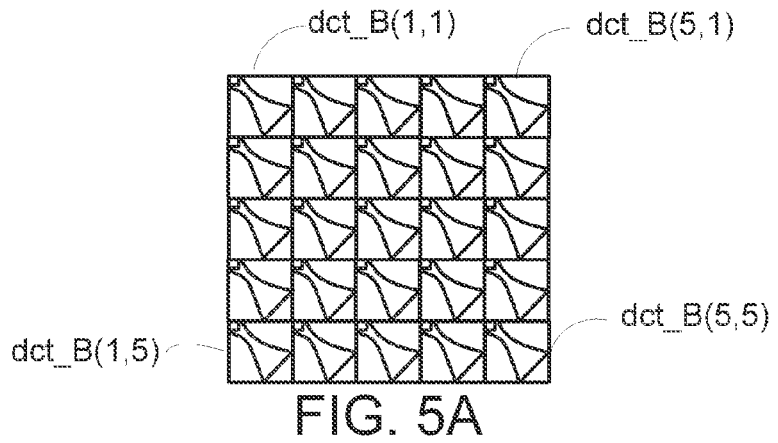
FIG. 5A is a schematic diagram illustrating a plurality of block transformation matrixes corresponding to respective gray-level blocks are generated after discrete cosine transformation is performed on respective gray-level blocks.

FIG. 5A is a schematic diagram illustrating a plurality of block transformation matrixes corresponding to respective gray-level blocks are generated after discrete cosine transformation is performed on respective gray-level blocks. Each block transformation matrix has features as illustrated in FIG. 4.

Figure 5B:
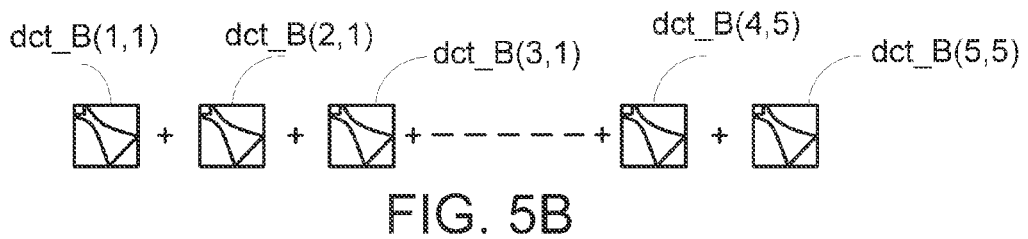
FIG. 5B is a schematic diagram illustrating accumulation of each block transformation matrix of FIG. 5A.

FIG. 5B is a schematic diagram illustrating accumulation of each block transformation matrix of FIG. 5A. The converting values at corresponding positions of each of the 5×5 block transformation matrixes as shown in FIG. 5A are accumulated to obtain an image transformation matrix as shown in FIG. 5C.

Figure 5C:
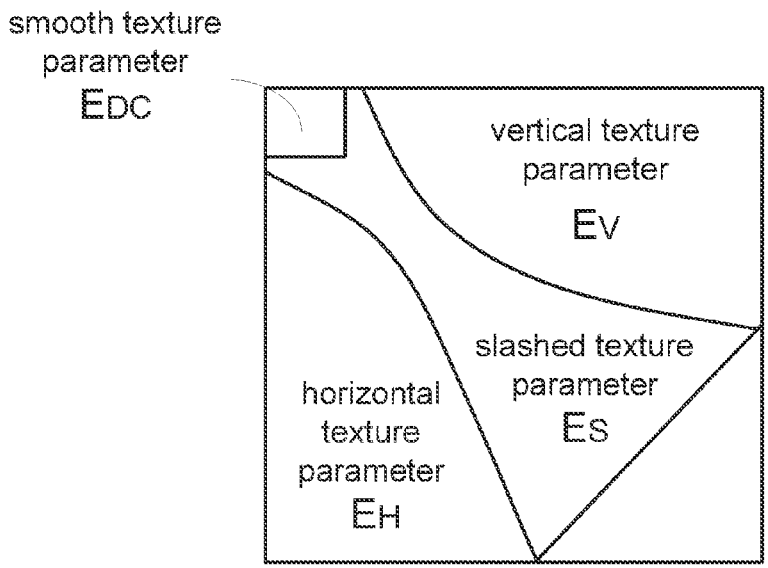
FIG. 5C is a schematic diagram illustrating an image transformation matrix obtained by accumulating the block transformation matrixes according to an embodiment of the present invention.

FIG. 5C is a schematic diagram illustrating an image transformation matrix obtained by accumulating the block transformation matrixes according to an embodiment of the present invention. Each value of the image transformation matrix is obtained by accumulating the block transformation matrixes as shown in FIG. 5B. Likewise, each block transformation matrix can be divided into a smooth texture area, a vertical texture area, a horizontal texture area and a slashed texture area.

Here, the texture features of an entire color source image are extracted and stored in the form of quantized values.

Thus, the present invention further defines a plurality of texture parameters. The texture parameters include a smooth texture parameter $E_{DC}$ corresponding to the smooth texture area, a vertical texture parameter $E_V$ corresponding to the vertical texture area, a horizontal texture parameter $E_H$ corresponding to the horizontal texture area, and a slashed texture parameter $E_S$ corresponding to the slashed texture area. The texture parameters are expressed in the following equations.

Smooth texture parameter is expressed in Equation 2.

$$E_{DC} = \sum_{r=1}^{\frac{M}{8} \times \frac{N}{8}} E_{DC_r} \qquad \text{(Equation 2)}$$

Slashed texture parameter is expressed in Equation 3.

$$E_S = \sum_{r=1}^{\frac{M}{8} \times \frac{N}{8}} E_{S_r} \qquad \text{(Equation 3)}$$

Vertical texture parameter is expressed as in Equation 4.

$$E_V = \sum_{r=1}^{\frac{M}{8} \times \frac{N}{8}} E_{V_r} \qquad \text{(Equation 4)}$$

Horizontal texture parameter is expressed as in Equation 5.

$$E_H = \sum_{r=1}^{\frac{M}{8} \times \frac{N}{8}} E_{H_r} \qquad \text{(Equation 5)}$$

Figure 6A:
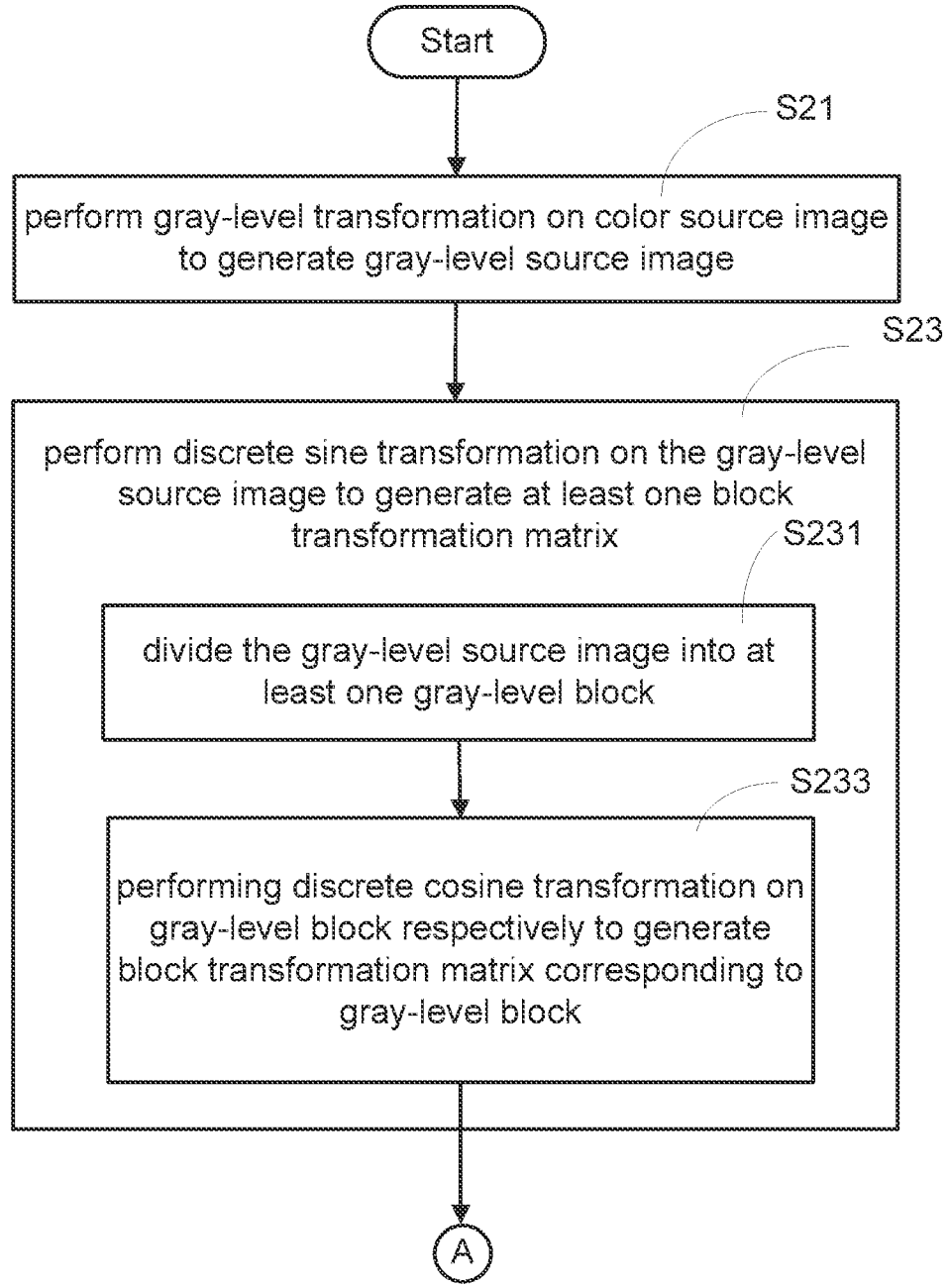
FIGS. 6A and 6B is a determination flowchart based on texture parameters according to an embodiment of the present invention.
Figure 6B:
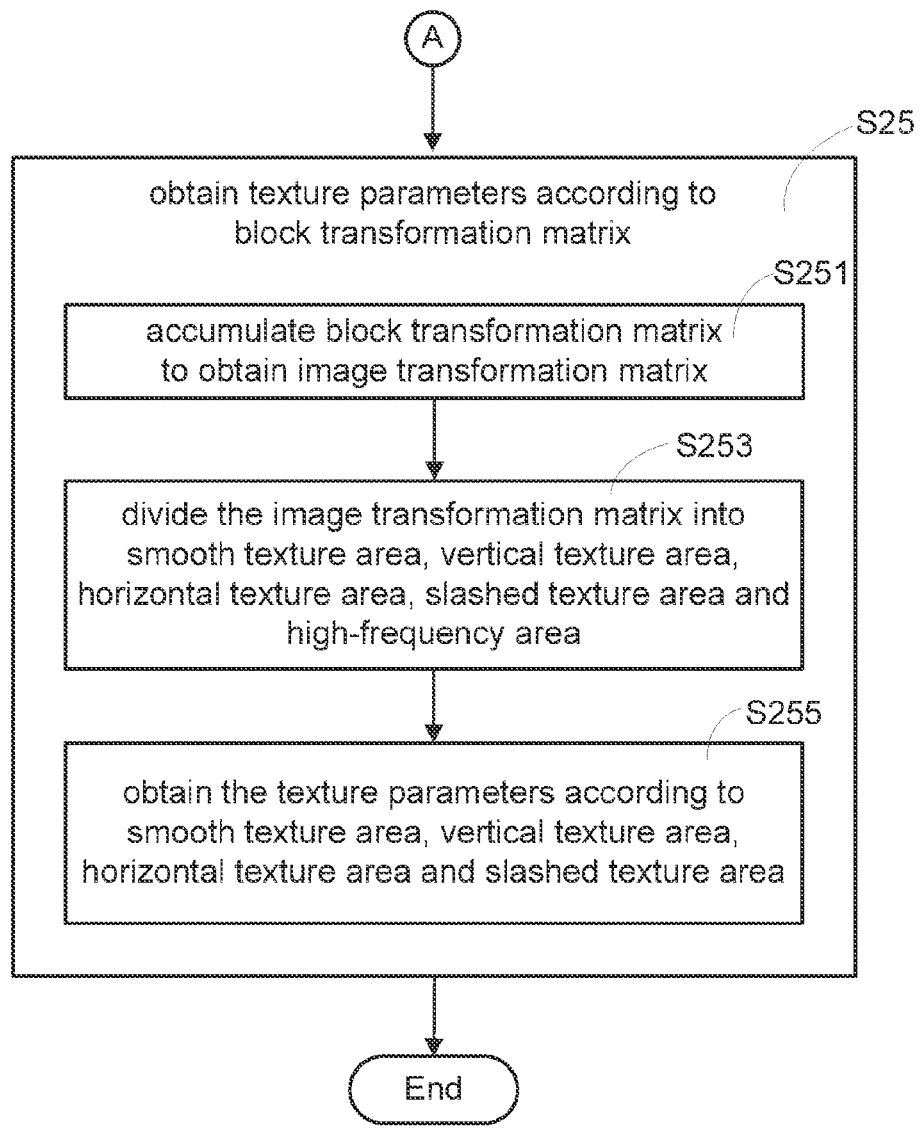

FIGS. 6A and 6B is a determination flowchart based on texture features according to an embodiment of the present invention. FIGS. 6A and 6B combine the approaches used in FIGS. 2A, 2B, 3A, 3B, 4, 5A, 5B and 5C.

Firstly, gray-level transformation is performed on a color source image to generate a gray-level source image (step S21, FIGS. 2A and 2B).

Next, discrete cosine transformation is performed on a gray-level source image to generate at least one block transformation matrix (step S23). Step S23 further includes sub-steps of S231~S233. The gray-level source image is divided into at least one gray-level block (step S231, FIG. 3A). Discrete cosine transformation is respectively performed on the at least one gray-level block for generating a block transformation matrix corresponding to the gray-level block (step S233, FIG. 3B, 4, 5A).

As disclosed above, each block transformation matrix includes a plurality of converting values. For instance, during 8×8 DCT, each block transformation matrix includes 8×8 converting values. Then, a plurality of texture parameters are obtained according to the block transformation matrixes (step S25, FIGS. 5B and 5C).

Step S25 further includes sub-steps S251~S255. The block transformation matrixes are accumulated to obtain an image transformation matrix, wherein the image transformation matrix includes a plurality of accumulated converting values (step S251, FIG. 5B). The image transformation matrix is divided into a smooth texture area, a vertical texture area, a horizontal texture area, a slashed texture area, and a high-frequency area (step S253). In addition, a smooth texture parameter $E_{DC}$ is obtained according to the smooth texture area, a vertical texture parameter $E_V$ is obtained according to the vertical texture area, a horizontal texture parameter $E_H$ is obtained according to the horizontal texture area, and a slashed texture parameter $E_S$ is obtained according to the slashed texture area (step S255).

It can be known with reference to the descriptions of FIG. 5B that when the number of block transformation matrixes is plural, step S25 further includes some sub-steps. The converting value at the first position of the first block transformation matrix and the converting value at the first position of the second block transformation matrix are summed up. The above summation process is repeated on the converting values at the first position of each block transformation matrix. The above processes on the converting values at positions of each block transformation matrix are repeated to obtain an image transformation matrix.

The determination of color features of an image is disclosed below.

Figure 7A:
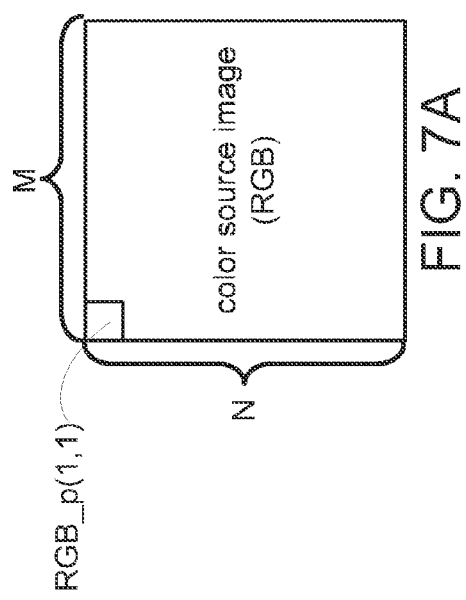
FIG. 7A is a schematic diagram illustrating a color source image represented by a prime color representation method.

FIG. 7A is a schematic diagram illustrating a color source image represented by a prime color representation method.

Firstly, let the chromaticity transformation matrix be exemplified as below.

$$\begin{bmatrix} 0.607 & 0.174 & 0.2 \\ 0.299 & 0.587 & 0.114 \\ 0 & 0.066 & 1.111 \end{bmatrix}$$

Through the chromaticity transformation matrix, the first prime color value (R), the second prime color value (G) and the third prime color value (B) corresponding to the color pixel contained in a color source image can be represented by a chromaticity representation method used in the CIE XYZ color system.

The method for converting prime color values into chromaticity values through a chromaticity transformation matrix is expressed in Equation 6.

$$\begin{bmatrix} X \\ Y \\ Z \end{bmatrix} = \begin{bmatrix} 0.607 & 0.174 & 0.2 \\ 0.299 & 0.587 & 0.114 \\ 0 & 0.066 & 1.111 \end{bmatrix} \begin{bmatrix} R \\ G \\ B \end{bmatrix} \qquad \text{(Equation 6)}$$

That is, the pixels change to be represented by the first chromaticity value (X), the second chromaticity value (Y) and the third chromaticity value (Z). Here, the pixels represented by a chromaticity representation method are referred as chromaticity pixels.

Figure 7B:
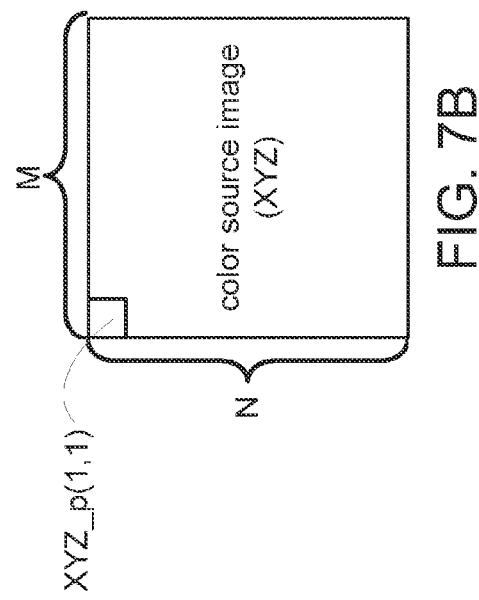
FIG. 7B is a schematic diagram illustrating a color source image represented by a chromaticity representation method.

FIG. 7B is a schematic diagram illustrating a color source image represented by a chromaticity representation method. Here, the conversion relationship is one-to-one. The color pixel at the position p(1,1) which was originally represented by RGB_p(1,1) is converted to a chromaticity pixel XYZ_p (1,1).

For convenience of comparison, a chromaticity pixel may further be normalized as chromatic values ranging between 0 and 1.

Figure 8:
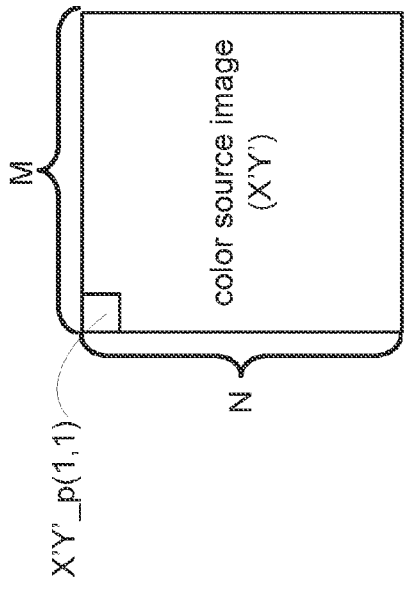
FIG. 8 is a schematic diagram illustrating chromaticity values converted to normalized chromatic values for each chromaticity pixel of the color source image.

FIG. 8 is a schematic diagram illustrating chromaticity values converted to normalized chromatic values for each chromaticity pixel of the color source image.

As indicated in FIG. 8, the first chromaticity value (X), the second chromaticity value (Y) and the third chromaticity value (Z) of each chromaticity pixel are normalized altogether to generate a first normalized chromatic value and a second normalized chromatic value.

Normalized chromatic values are obtained from chromatic values according to Equation 7.

$$\begin{bmatrix} X' \\ Y' \end{bmatrix} = \begin{bmatrix} \frac{X}{X+Y+Z} \\ \frac{Y}{X+Y+Z} \end{bmatrix} \qquad \text{(Equation 7)}$$

The first normalized chromatic value (X') is expressed as the first chromaticity value (X) divided by summation of the first chromaticity value (X), the second chromaticity value (Y) and the third chromaticity value (Z) of the chromaticity pixel, that is, X'=X/(X+Y+Z).

The second normalized chromatic value (Y') is expressed as the second chromaticity value (Y) divided by summation of the first chromaticity value (X), the second chromaticity value (Y) and the third chromaticity value (Z) of the chromaticity pixel, that is, Y'=Y/(X+Y+Z).

Figure 9:
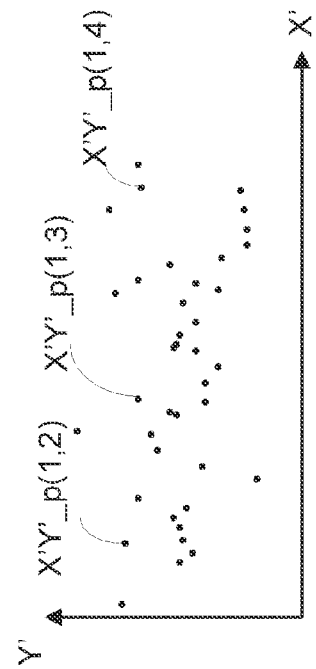
FIG. 9 is a schematic diagram illustrating a color source image mapped onto a chromaticity plane according to a first normalized chromatic value and a second normalized chromatic value.

FIG. 9 is a schematic diagram illustrating a color source image mapped onto a chromaticity plane according to a first normalized chromatic value and a second normalized chromatic value. The horizontal axis of the chromaticity plane corresponds to the first normalized chromatic value X'. The vertical axis of the chromaticity plane corresponds to the second normalized chromatic value Y'.

FIG. 9 is equivalent to mapping the color information corresponding to each color pixel of a color source image onto a two dimensional chromaticity plane. Thus, number of points in the chromaticity plane as shown in FIG. 9 is equivalent to number of color pixels in the color source image.

For instance, X'Y'_p(1,2) represents the first and the second normalized chromatic values corresponding to the color pixel at the first row and the second column of the color source image. X'Y'_p(1,3) represents the first and the second normalized chromatic values corresponding to the color pixel at the first row and the third column of the color source image. X'Y'_p(1,4) represents the first and the second normalized chromatic values corresponding to the color pixel at the first row and the fourth column of the color source image. The color pixels at other positions of the color source image can be obtained by analogy.

On the chromaticity plane, the same set of normalized chromatic values may correspond to a plurality of pixels at the same time. This is because pixels at different positions in the color source image may correspond to the same chromaticity. Thus, a many-to-one correspondence between positions on the chromaticity plane and their corresponding pixels may exist.

For convenience of calculation, the normalized chromatic values can be quantized within a specific numeric interval. For instance, each of the first and the second normalized chromatic values is multiplied by 256 and then is divided by 1000, such that the first and the second normalized chromatic values are quantized between 0~256. The specific numeric interval can be adjusted according to the needs in practical application or the processing speed of the system.

Moreover, the present invention collects statistics relating to number of pixels corresponding to each point on the chromaticity plane. Here, C (x',y') represents the number of pixels corresponding to the position (x',y') on the chromaticity plane. Based on the concept of the present invention, different chromaticity planes are obtained from different color source images. Therefore, the number of pixels corresponding to positions on the chromaticity plane (statistical results) C (x', y') can be used to represent the color features of a color source image.

The present invention also defines a combination of chromaticity densities which is taken in conjunction with the number of pixels corresponding to positions on the chromaticity plane.

The present invention firstly defines a sum of powers as the summation of power of the first normalized chromatic value and power of the second normalized chromatic value. For simplification purpose, let the summation of powers be expressed as p+q, wherein the first power p corresponds to the first normalized chromatic value and the second power q corresponds to the second normalized chromatic value.

Given that the summation of powers p+q≤2, the combination of chromaticity densities composed of the first power p and the second power q may have 6 scenarios being (p=0, q=0), (p=0,q=1), (p=1,q=0), (p=0, q=2), (p=1,q=1), and (p=2, q=0).

Then, the calculation of color momentum $m_{pq}$ according to the combination of chromaticity densities and the number of pixels corresponding to positions on the chromaticity plane is expressed in Equation 8.

$$m_{pq} = \sum_{x=0}^{X_L} \sum_{y=0}^{Y_L} x^p y^q C(x, y) \qquad \text{(Equation 8)}$$

Wherein, $X_L, Y_L$ represent a quantized value 256. It can be known from the above equation that the number of color momentums is determined according to the number of combinations of chromaticity densities. Thus, given that the sum of powers satisfies p+q≤2, 6 color momentums are correspondingly generated.

$$\text{First color momentum } m_{00} = \sum_{x=0}^{X_{256}} \sum_{y=0}^{Y_{256}} x^0 y^0 C(x, y) \qquad \text{(Equation 9)}$$

$$\text{Second color momentum } m_{01} = \sum_{x=0}^{X_{256}} \sum_{y=0}^{Y_{256}} x^0 y^1 C(x, y) \qquad \text{(Equation 10)}$$

$$\text{Third color momentum } m_{10} = \sum_{x=0}^{X_{256}} \sum_{y=0}^{Y_{256}} x^1 y^0 C(x, y) \qquad \text{(Equation 11)}$$

$$\text{Fourth color momentum } m_{11} = \sum_{x=0}^{X_{256}} \sum_{y=0}^{Y_{256}} x^1 y^1 C(x, y) \qquad \text{(Equation 12)}$$

$$\text{Fifth color momentum } m_{02} = \sum_{x=0}^{X_{256}} \sum_{y=0}^{Y_{256}} x^0 y^2 C(x, y) \qquad \text{(Equation 13)}$$

$$\text{Sixth color momentum } m_{20} = \sum_{x=0}^{X_{256}} \sum_{y=0}^{Y_{256}} x^2 y^0 C(x, y) \qquad \text{(Equation 14)}$$

Although it is assumed that the sum of powers is less than or equal to 2 (p+q≤2) in above equations, the summation of powers may be equivalent to other values (such as less than or equal to 3) in practical application. Consequentially, the combination of chromaticity densities composed of the first power p and the second power q may change, and the number of color momentums will change accordingly.

Figure 10A:
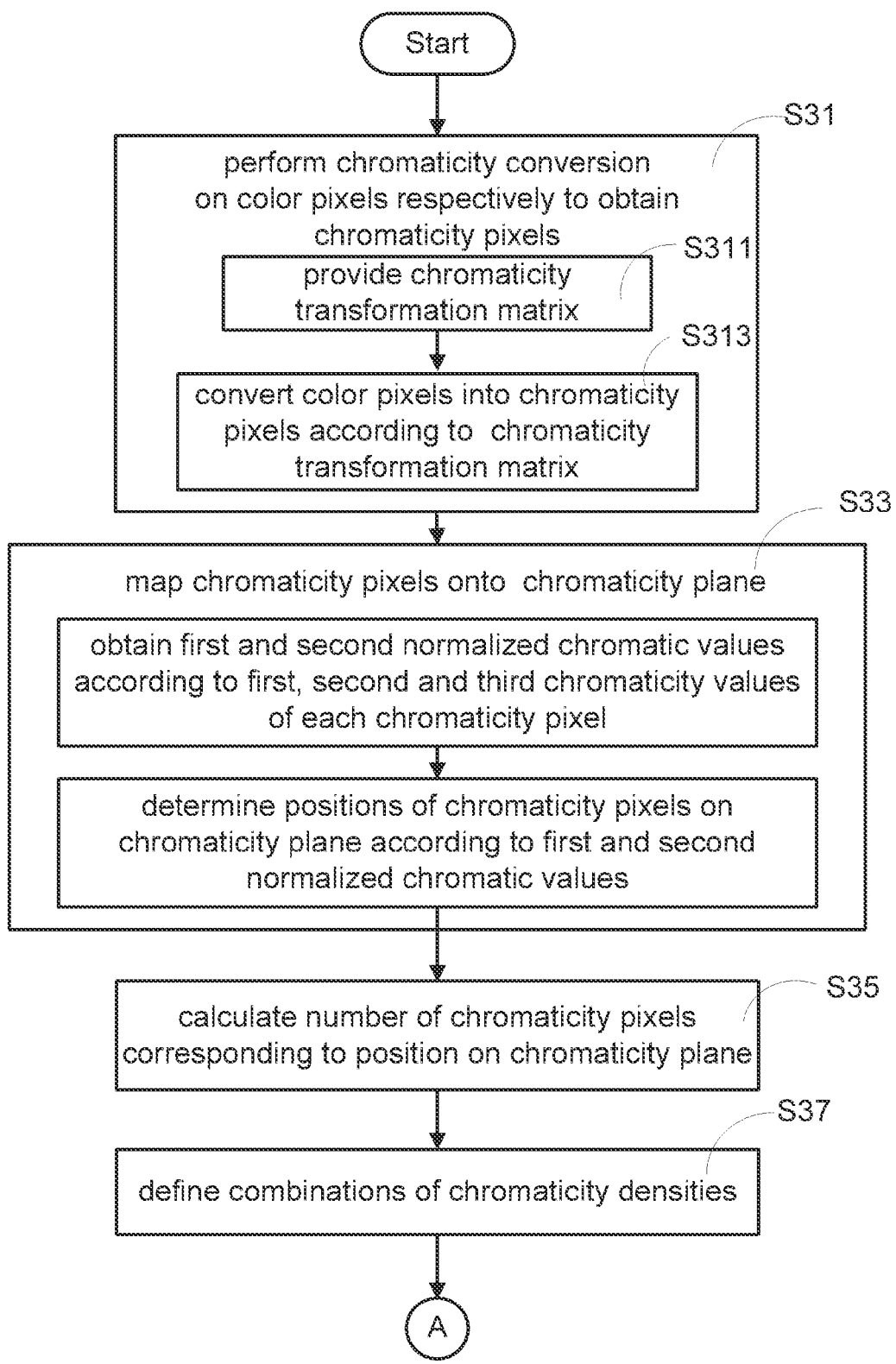
FIGS. 10A and 10B respectively are a flowchart of obtaining color momentums based on color features according to an embodiment of the present invention.
Figure 10B:
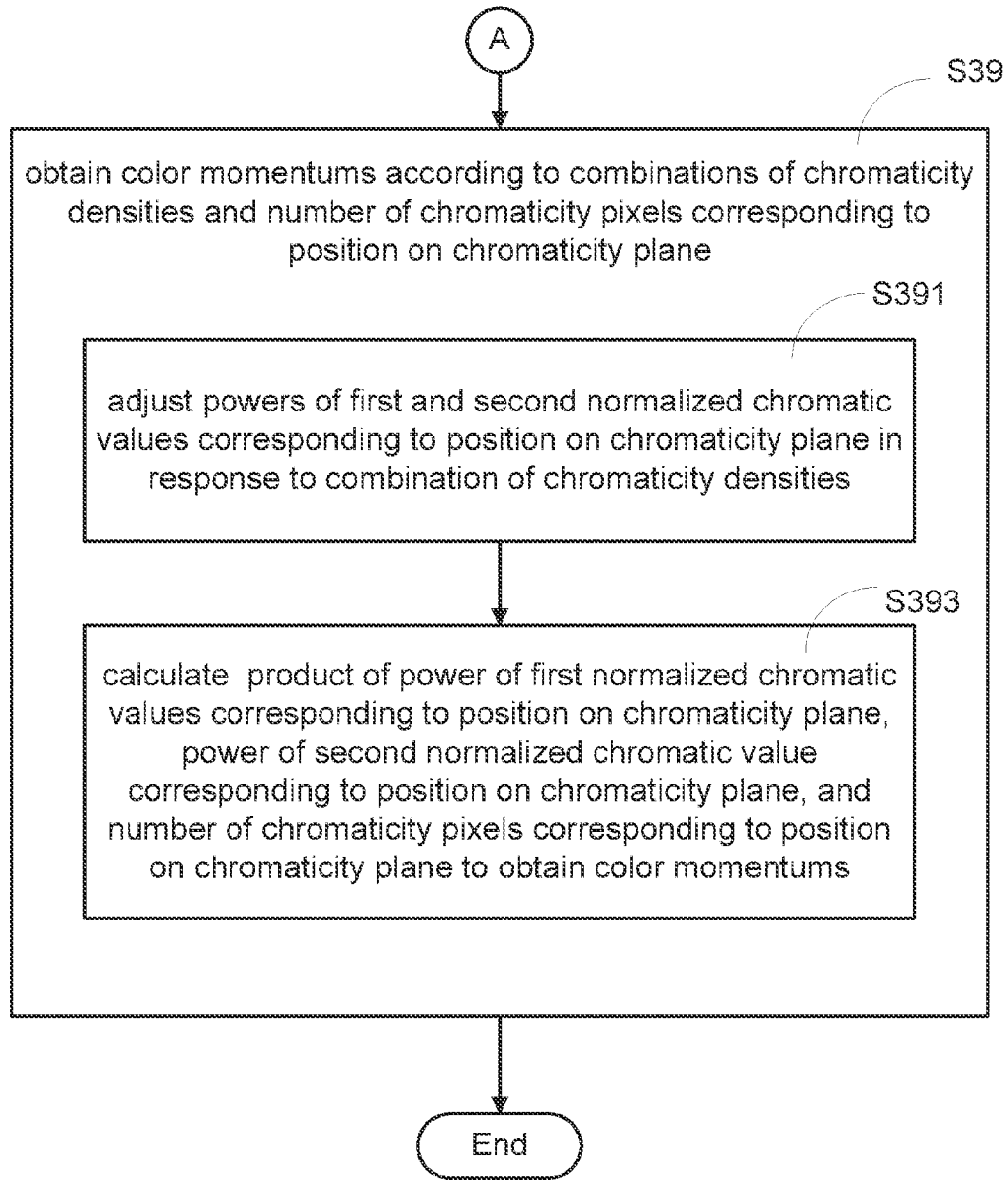

FIGS. 10A and 10B respectively are a flowchart of obtaining color momentums based on color features according to an embodiment of the present invention. It can be known from FIGS. 7A, 7B, 8 and 9, the step S12 of proceeding texture feature extraction on the color source image to obtain a plurality of color momentums includes steps S31-S39.

In step S31, chromaticity conversion is performed on color pixels respectively to obtain a plurality of chromaticity pixels (FIGS. 7A, 7B). In step S33, the plurality of chromaticity pixels are mapped onto the chromaticity plane (FIG. 9). In step S35, number of chromaticity pixels corresponding to positions on the chromaticity plane is calculated/counted. In step S37, a plurality of combinations of chromaticity densities are defined. In step S39, a plurality of color momentums are obtained according to the plurality of combinations of chromaticity densities and the number of pixels corresponding to positions on the chromaticity plane.

Step S31 further includes steps S311 and S313. In step S311, a chromaticity transformation matrix is provided. In step S313, color pixels represented by a prime color representation method are converted into chromaticity pixels represented by a chromaticity representation method according to the chromaticity transformation matrix (step S313).

Step S33 further includes steps S331 and S333. In step S331, a first normalized chromatic value X' and a second normalized chromatic value Y' representing a chromaticity pixel are obtained according to the first, the second and the third chromaticity values of the chromaticity pixel. In step S333, a position of the chromaticity pixel on a chromaticity plane is determined according to the first normalized chromatic value X' and the second normalized chromatic value Y' representing the chromaticity pixel.

Step S331 is for obtaining the first and the second normalized chromatic values of each chromaticity pixel, and includes following sub-steps.

The first normalized chromatic value representing the first chromaticity pixel $(X_{p11}/(X_{p11}+Y_{p11}+Z_{p11}))$ is obtained according to the first chromaticity value $(X_{p11})$ of the first chromaticity pixel and a summation of the first chromaticity value $(X_{p11})$, the second chromaticity value $(Y_{p11})$ and the third chromaticity value $(Z_{p11})$ of the first chromaticity pixel (the summation=$X_{p11}+Y_{p11}+Z_{p11}$).

The second normalized chromatic value representing the first chromaticity pixel $(Y_{p11}/(X_{p11}+Y_{p11}+Z_{p11}))$ is obtained according to the second chromaticity value $(Y_{p11})$ of the first chromaticity pixel and a summation of the first chromaticity value $(X_{p11})$ of the first chromaticity pixel plus the second chromaticity value $(Y_{p11})$ and the third chromaticity value $(Z_{p11})$ of the first chromaticity pixel (the summation=$X_{p11}+Y_{p11}+Z_{p11}$). The above process is repeated and applied to each of the chromaticity pixels $(P_{11} \sim P_{MN})$.

Step S331 further includes sub-steps of: quantizing on the first normalized chromatic value $(X_{p11}/(X_{p11}+Y_{p11}+Z_{p11}))$ and the second normalized chromatic value $(Y_{p11}/(X_{p11}+Y_{p11}+Z_{p11}))$ representing the chromaticity pixel.

Step S39 further includes steps S391 and S393.

In step S391, power of the first normalized chromatic value and power of the second normalized chromatic value corresponding to positions on the chromaticity plane are adjusted in response to each combination of the chromaticity densities. In step S393, a product of power of the first normalized chromatic, power of the second normalized chromatic value corresponding to positions on the chromaticity plane and number of pixels corresponding to positions on the chromaticity plane is calculated to obtain the plurality of color momentums.

Figure 11:
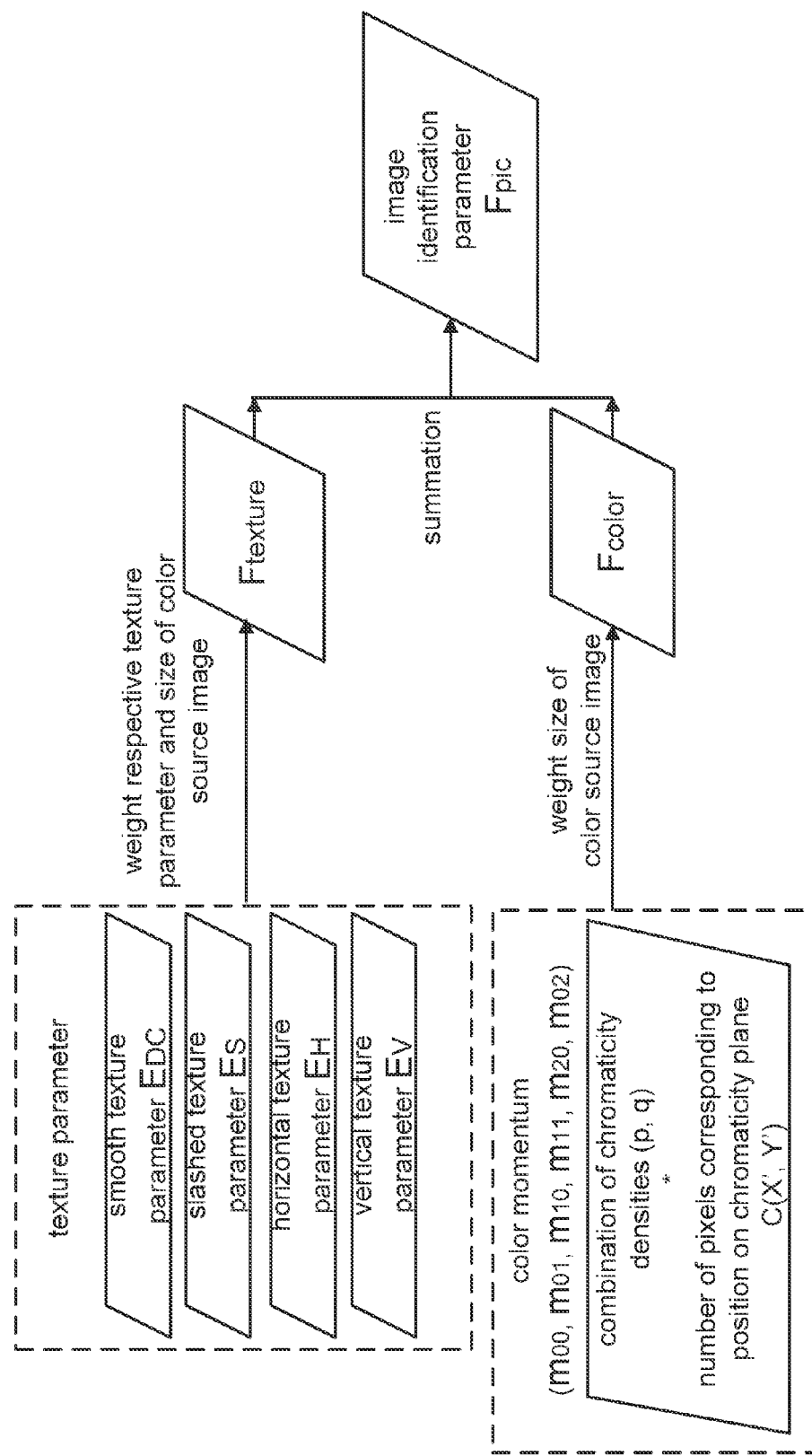
FIG. 11 is a schematic diagram illustrating image identification parameters generated according to a plurality of texture parameters and a plurality of color momentums.

FIG. 11 is a schematic diagram illustrating image identification parameters generated according to texture parameters and color momentums. FIG. 6 and FIG. 10 illustrate how the texture parameters and the color momentums are obtained. FIG. 11 illustrates how the image identification parameter $F_{pic}$ is generated according to the texture parameters and the color momentums.

Please refer to FIG. 11. In step S13, the texture identification parameter and the color identification parameter are obtained respectively and then the texture identification parameter $F_{texture}$ and the color identification parameter $F_{color}$ are summed up to obtain an image identification parameter $F_{pic}$.

That is, the texture parameters and the size of the color source image are weighted to obtain the texture identification parameter $F_{texture}$. The texture parameters include a smooth texture parameter $E_{DC}$, a slashed texture parameter $E_S$, a horizontal texture parameter $E_H$, and a vertical texture parameter $E_V$.

The color momentums and the size of the color source image are weighted to obtain a color identification parameter $F_{color}$. The color momentum is calculated according to combinations of chromaticity densities and number of chromaticity pixels corresponding to positions on the chromaticity plane.

Then, the texture identification parameter $F_{texture}$ and the color identification parameter $F_{color}$ are weighted and summed up to obtain an image identification parameter $F_{pic}$.

The descriptions for generating the texture identification parameter $F_{texture}$ and the color identification parameter $F_{color}$ respectively are disclosed below.

Firstly, the generation of the texture identification parameter $F_{texture}$ is disclosed below.

Corresponding weights of texture parameters can be adjusted according to the size of the color source image before weighting calculation is performed. For instance, when the color source image is larger than 1000 times, each texture parameter is multiplied by 2. This step can be selectively added.

The generation of the texture identification parameter $F_{texture}$ is defined as: weighting the plurality of texture parameters the texture parameter according to a smooth texture weight a corresponding to the smooth texture parameter, a vertical texture weight b corresponding to the vertical texture parameter, a horizontal texture weight c corresponding to the horizontal texture parameter, and a slashed texture weight d corresponding to the slashed texture parameter.

It should be noted that apart from setting the texture identification parameter $F_{texture}$ as the summation of products of the texture parameters and their respective texture weights, the texture identification parameter $F_{texture}$ can be calculated according to proportions of texture parameters. A number of possible calculations are exemplified below.

$$F_{texture} = a \times |E_{DC}| + b \times |E_V| + c \times |E_H| + d \times |E_S| \quad \text{(Equation 15)}$$

$$F_{texture} = a \times |E_{DC}| + \frac{b}{c} \times \left|\frac{E_V}{E_H}\right| + d \times |E_S| \quad \text{(Equation 16)}$$

$$F_{texture} = a \times |E_{DC}| + \frac{c}{b} \times \left|\frac{E_H}{E_V}\right| + d \times |E_s| \quad \text{(Equation 17)}$$

$$F_{texture} = \frac{a}{d} \times \left|\frac{E_{DC}}{E_S}\right| + \frac{c}{b} \times \left|\frac{E_H}{E_V}\right| \quad \text{(Equation 18)}$$

Let Equation 16 be taken for example. Given that a=0.7, b/c=0.15, d=0.15, the value of the texture identification parameter $F_{texture}$ is expressed in Equation 19.

$$F_{texture} = 0.7 \times |E_{DC}| + 0.15 \times \left|\frac{E_V}{E_H}\right| + 0.15 \times |E_S| \quad \text{(Equation 19)}$$

Under ordinary circumstances, the color source image contains a high proportion of smooth texture. Thus, it is assumed that the weight of smooth texture is the maximum among the texture weights.

When calculating the texture identification parameter $F_{texture}$, the values of texture parameters and corresponding texture weights (a, b, c, d) of the texture parameters are only used for representing the weight values corresponding to the texture parameters, and the values of weights a, b, c, d may vary with the attributes of the color source image. For instance, when the image has a higher proportion of horizontal texture and the contrast of horizontal texture is emphasized. In such case, the weight value corresponding to the horizontal texture feature becomes larger.

Moreover, the values of weights a, b, c, d may vary in different equations.

Besides, the values of texture weights may change according to the type of the image as long as the summation of the coefficients at the right-hand side of each equation disclosed above is equal to 1.

The generation of the color identification parameter $F_{color}$ is disclosed below.

The color identification parameter $F_{color}$ corresponding to the color source image is calculated according to a plurality of color momentums ($m_{00}$, $m_{01}$, $m_{10}$, $m_{11}$, $m_{02}$, $m_{20}$). To simplify the calculation process, the color momentums having minor influence can be neglected in the calculation of color identification parameters. For instance, the first color momentum $|m_{00}|$ can be neglected.

In addition, the corresponding weights of the color momentums can be adjusted according to the size of the color source image. Thus, a size scaling factor z is used as a weight for each chromaticity momentum.

$$F_{color} = z \times |m_{00}| + z \times |m_{01}| + z \times |m_{10}| + z \times |m_{11}| + z \times |m_{02}| + z \times |m_{20}| \quad \text{(Equation 20)}$$

The scaling weight z is provided because the color source image may have different aspect ratios.

The color source image with larger size has more pixels, and accordingly has more points on the corresponding chromaticity plane. Thus, there are more chromaticity pixels corresponding to the same position on the chromaticity plane. When calculating the color identification parameters, the size scaling factor z is added to resolve the difference in image size.

Let the size of the first color source image A1 be 100×100. When the color source image is 100×100, the size scaling factor is equal to 1. Then, the calculation of the color identification parameter of the first color source image A1 is expressed in Equation 21.

$$F_{color-A} = |m_{00}^A| + |m_{01}^A| + |m_{10}^A| + |m_{11}^A| + |m_{02}^A| + |m_{20}^A| \quad \text{(Equation 21)}$$

On the other hand, when the second color source image A2 and the first color source image A1 have the same contents. However, the second color source image is with the size of are 400×400. In other words, the size of the second color source image A2 is (400*400)/(100*100)=16 times larger than the first color source image A1. By setting the size scaling factor to be 1/16, $F_{color-B}$ will then be equal to $F_{color-A}$.

$$F_{color-B} = \frac{1}{16} \times |m_{00}^B| + \frac{1}{16} \times |m_{01}^B| + \frac{1}{16} \times |m_{10}^B| + \frac{1}{16} \times |m_{11}^B| + \frac{1}{16} \times |m_{02}^B| + \frac{1}{16} \times |m_{20}^B| \quad \text{(Equation 22)}$$

When the above process is repeated on different color source images, the texture parameters ($E_{DC}$, $E_V$, $E_H$, $E_S$) and the color momentums (m00, m01, m10, m11, m02, m20) corresponding to the source images can be obtained. Then, the texture identification parameter $F_{texture}$ and the color identification parameter $F_{color}$ corresponding to the color source image are obtained.

For instance, the first texture identification parameter $F_{texture-A}$ and the first color identification parameter $F_{color-A}$ correspond to the first color source image A, and the second texture identification parameter $F_{texture-B}$ and the second color identification parameter $F_{color-B}$ correspond to the second color source image B.

Degree of similarity between the first color source image A and the second color source image B can be determined according to the texture identification parameter $F_{texture}$ and the color identification parameter $F_{color}$ corresponding to the two color source images.

The image differential parameter $D_{AB}$ is defined as a summation of difference between two texture parameters and the difference between two color momentums. The image differential parameter $D_{AB}$ is expressed in Equation 23.

$$D_{AB} = |F_{texture-A} - F_{texture-B}| + |F_{color-A} - F_{color-B}| \quad \text{(Equation 23)}$$

When the image differential parameter is calculated according to Equation 23, it must be confirmed that the first color source image A and the second color source image B are consistent in terms of the basis for calculating the texture parameters and the color momentums.

For instance, the numbers and values of texture weights must be the same when calculating texture parameters. On the other hand, the size scaling factor must be taken into consideration in the calculation of color momentums.

The difference between each color source image of the database and the to-be-tested color source image is calculated according to Equation 23. Following the computation of Equation 23, the color source image with minimum difference can be easily located from the database.

Figure 12A:
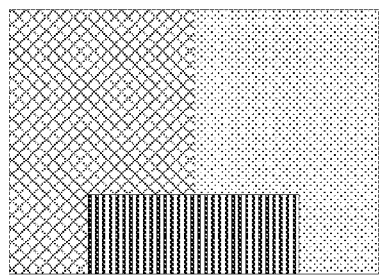
FIG. 12A is a schematic diagram illustrating a first color source image presumably used for comparison.

FIG. 12A is a schematic diagram illustrating a first color source image presumably used for comparison. As indicated in FIG. 12A, the first color source image is presumably divided into two halves: a left half and a right half. The left-half block has meshed shedding in blue color, and the right-half block has dotted shedding in red color. Presumably, there are vertical stripes in black/white colors near the lower edge of the first source image.

Figure 12B:
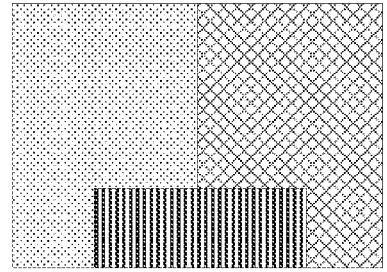
FIG. 12B is a schematic diagram illustrating determination of degree of similarity between a first color source image and a second color source image according to a comparison between the two color source images.

FIG. 12B is a schematic diagram illustrating determination of degree of similarity between a first color source image and a second color source image according to a comparison between the two color source images. FIG. 12B is similar to FIG. 12A except that the left-half and the right-half blocks of the second source image of FIG. 12B are opposite to that of the first source image of FIG. 12B.

Given that the determination of image similarity is based on color features alone, two different color source images, such as FIGS. 12A and 12B, may be mistaken as the same image if proportion of the red color and the blue color are the same. When the identification method of the present invention is used, texture features are taken into consideration and it is determined that the texture features of the two color source images are not the same.

Figure 13:
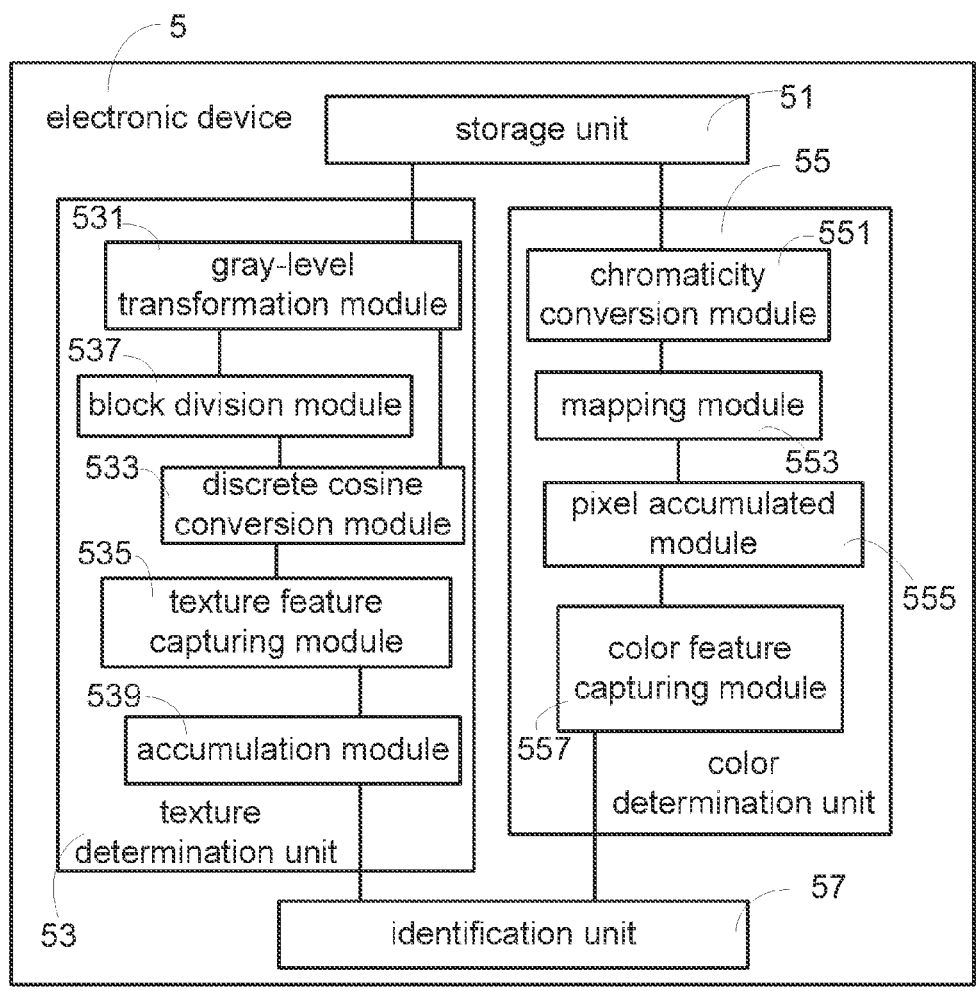
FIG. 13 is a block diagram illustrating an electronic device with image identification function according to an embodiment of the present invention; and, FIG. 14 is a schematic diagram illustrating image identification based on three color source images.

FIG. 13 is a block diagram illustrating an electronic device with image identification function according to an embodiment of the present invention. The electronic device 5 as shown in FIG. 13 may refer to any electronic products storing color source images such as server of search engine, personal computer, and digital photo frame etc.

The electronic device 5 of the present invention includes a storage unit 51, a texture determination unit 53, a color determination unit 55 and an identification unit 57. Both the texture determination unit 53 and the color determination unit 55 are electrically connected to the storage unit 51 and the identification unit 57.

The storage unit 51 stores a color source image. The texture determination unit 53 extracts texture features from the color source image to obtain the texture parameters. The color determination unit 55 extracts color features from the color source image to obtain the color momentums.

The identification unit 57 obtains an image identification parameter $F_{pic}$ after weighting the plurality of texture parameters and the plurality of color momentums. Also, the identification unit 57 can selectively adjust the weights corresponding to the texture parameters and the color momentums according to the size of the color source image.

With respect to the application in the search and comparison of images, the electronic device 5 performs similar processing on a plurality of color source images. The storage unit 51 respectively provides different memory addresses in which different color source images (such as the first color source image and the second color source image) are stored.

Accordingly, the texture determination unit 53 and the color determination unit 55 extract texture features parameters and color momentums from the color source images. Then, the identification unit 57 generates a first image identification parameter corresponding to the first color source image and a second image identification parameter corresponding to the second color source image.

The identification unit 57 may include a comparison module (not illustrated) which compares the first image identification parameter with the second image identification parameter. The closer to each other the first image identification parameter and the second image identification parameter are, the higher the degree of similarity between the first color source image and the second color source image will be.

The texture determination unit 53 includes a gray-level transformation module 531, a discrete cosine conversion module 533, a texture feature capturing module 535, a block division module 537, and an accumulation module 539.

The gray-level transformation module 531 is electrically connected to the storage unit 51. The gray-level transformation module 531 transforms the color source image to generate a gray-level source image.

The block division module 537 is electrically connected to the gray-level transformation module 531 for dividing the gray-level source image into a plurality of gray-level blocks.

The discrete cosine conversion module 533 is electrically connected to the gray-level transformation module 531 and the block division module 537 for performing discrete cosine transformation on the gray-level source image to generate a plurality of block transformation matrixes.

The texture feature capturing module 535 is electrically connected to the discrete cosine conversion module 533 for obtaining texture parameters according to the block transformation matrixes.

The accumulation module 539 is electrically connected to the texture feature capturing module 535 and the identification unit 57 for accumulating the block transformation matrixes to obtain an image transformation matrix.

The color determination unit 55 includes a chromaticity conversion module 551, a mapping module 553, a pixel accumulated module 555, and a color feature capturing module 557.

The chromaticity conversion module 551 is electrically connected to the storage unit 51. The chromaticity conversion module 551 converts the plurality of color pixels into the plurality of chromaticity pixels according to the chromaticity transformation matrix which can be pre-stored in the storage unit 51.

The mapping module 553 is electrically connected to the chromaticity conversion module 551. The mapping module 553 maps the plurality of chromaticity pixels onto a chromaticity plane.

The pixel accumulated module 555 is electrically connected to the mapping module 553. The pixel accumulated module 555 calculates the number of pixels corresponding to positions on the chromaticity plane.

The color feature capturing module 557 is electrically connected to the pixel accumulated module 555 and the identification unit 57. The color feature capturing module 557 obtains the color momentums according to the combinations of chromaticity densities and the number of pixels corresponding to positions on the chromaticity plane.

Figure 14:
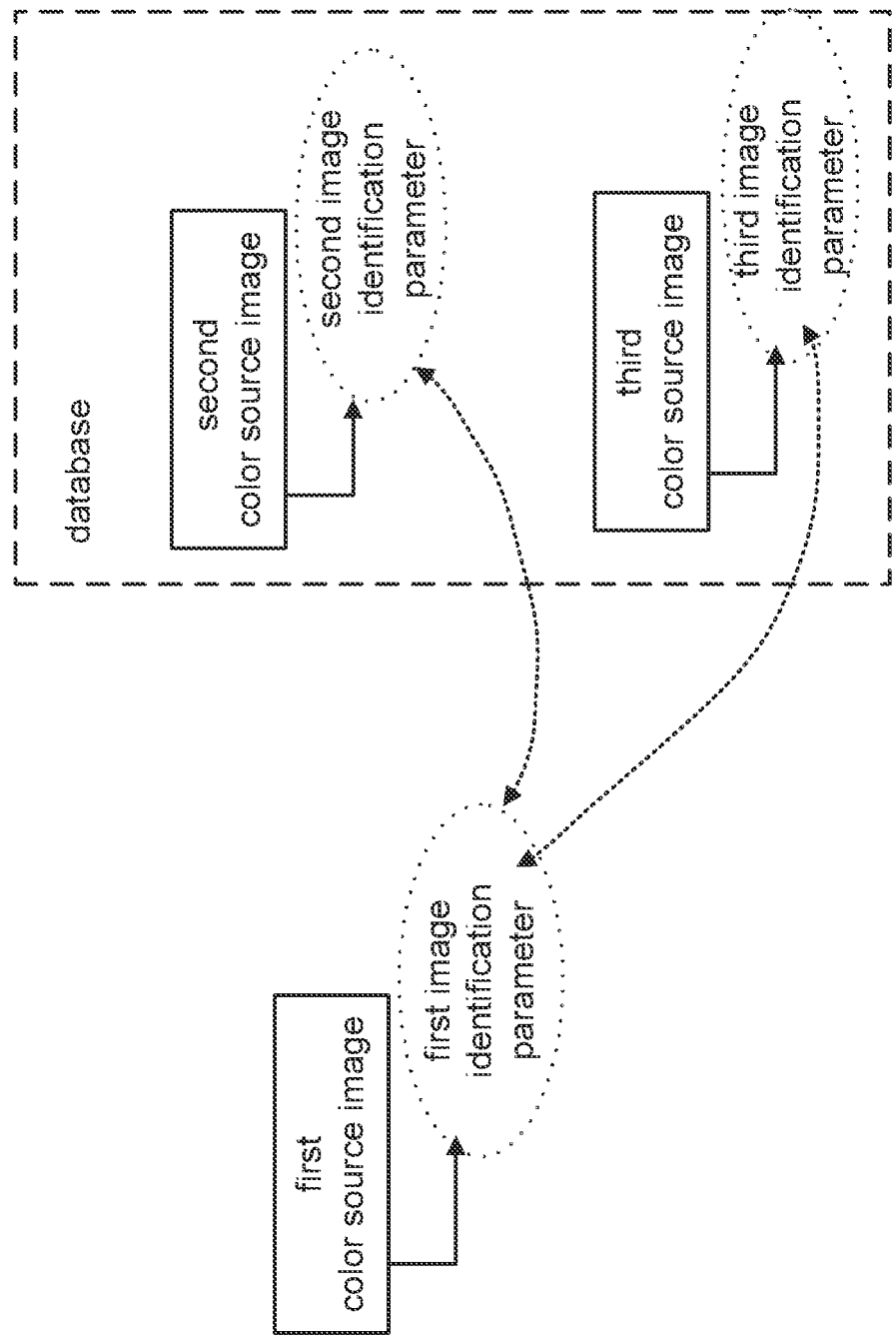

FIG. 14 is a schematic diagram illustrating image identification based on three color source images. Suppose the first color source image is the image used by the user for searching purpose. The second color source image and the third the color source image are existing images in the database. As disclosed above, in response to the difference in image size, a scaling factor is taken into consideration when calculating image identification parameters.

It can be known from the above disclosure that the first image identification parameter for the first color source image can be obtained through calculation. Likewise, the second image identification parameter for the second color source image can be obtained through calculation, and so can the third image identification parameter for the third the color source image be obtained through calculation.

Then, a difference between the first image identification parameter and the second image identification parameter and a difference between the first image identification parameter and the third image identification parameter are calculated, and a comparison between the two differences is made accordingly.

If the difference between the first and the second image identification parameters is smaller than the difference between the first and the third image identification parameters, this implies that the first color source image is more similar to the second color source image than to the third color source image.

Conversely, if the difference between the first and the third image identification parameters is smaller than the difference between the first and the second image identification parameters, this implies that the first color source image is more similar to the third color source image than to the second color source image.

By the same token, when the search engine or the database inside the electronic device has many existing source images, the image most similar to the to-be-retrieved color source image can be located according to the image identification process disclosed above.

Based on the concept of the present invention, when the search engine or the electronic device provides image search function, a pre-determined reference image size can be provided. The reference image size can be applied on each color source image and used as a comparison reference, and a corresponding scaling factor is determined accordingly. Once the scaling factor is determined, the weights of the texture identification parameter Ftexture and the color identification parameter Fcolor are adjusted according to the scaling factor to calculate a corresponding image identification parameter $F_{pic}$.

Then, the color source images and their corresponding image identification parameters are stored. When image search is performed, the reference image size is applied on the to-be-retrieved color source image. By adjusting the weight according to the scaling factor, the image identification parameter corresponding to the to-be-retrieved color source image can be obtained through calculation.

The images pre-stored in the database are searched such that the image whose image identification parameter is closest to the image identification parameter of the to-be-retrieved color source image can be located from the database. Among images of the database, the located image is the image most similar to the to-be-retrieved color source image.

The invention can further be used in any computer program product storing a software program. When the software program is executed, the electronic device with a controller will perform the image identification method disclosed above. Or, the computer program product may perform image identification with texture feature or color feature alone.

When the identification method of the present invention obtains an image identification parameter, factors such as colors (chromaticity), color distribution, shapes (texture) and perceiving depth and size (scale) are taken into consideration. The identification method of the present invention is close to users' intuition and similar to the naked eye comparison. Therefore, the image identification function provided in the present invention is more conformed to users' needs. The invention provides CBIR function such that the input for image search is not limited to texts, and the process of image search is made more convenient.

Anyone who is skilled in the technology field of the present invention will understand that various logic blocks, modules, circuits and procedures used for exemplification purpose in the above descriptions can be implemented by electronic hardware, computer software, or a combination thereof. The connection mode can be implemented by way of in communication with, connection, coupling, electrical connection or alternative approaches. These connection modes illustrate that in the implementation of logic blocks, modules, circuits and procedures, signals can be exchanged in a direct or indirect manner to exchange or transmit signals, data and control information through different means. For instance, signals, data and control information can be exchanged or transmitted through cabled electronic signals, wireless electromagnetic signals and optical signals. Thus, the terminologies used in the present specification are not restrictive in the implementation of connection relationship of the present invention, and the scope of protection of the present invention will not be affected by the connection mode.

While the invention has been described by way of example and in terms of the preferred embodiment(s), it is to be understood that the invention is not limited thereto. On the contrary, it is intended to cover various modifications and similar arrangements and procedures and the scope of the appended claims therefore should be accorded the broadest interpretation so as to encompass all such modifications and similar arrangements and procedures.

What is claimed is:

1. An image identification method applied to a color source image and executed by an electronic device, comprising steps of:
   storing the color source image;
   proceeding texture feature extraction on the color source image to obtain a plurality of texture parameters;
   proceeding color feature extraction on the color source image to obtain a plurality of color momentums;
   weighting the plurality of texture parameters and the plurality of color momentums to obtain an image identification parameter corresponding to the color source image; and
   adjusting weights corresponding to the plurality of texture parameters and weights corresponding to the plurality of color momentums according to size of the color source image.

2. The identification method according to claim 1, wherein the step of proceeding texture feature extraction on the color source image to obtain the plurality of texture parameters comprises steps of:
   converting the color source image to a gray-level source image;
   performing discrete cosine transformation on the gray-level source image to generate at least one block transformation matrix; and,
   obtaining the plurality of texture parameters according to the at least one block transformation matrix.

3. The identification method according to claim 2, wherein the gray-level source image comprises a plurality of gray-level pixels whose gray levels are obtained by calculating a plurality of color pixels contained in the color source image according to a gray-level transformation equation.

4. The identification method according to claim 3, wherein the gray-level transformation equation defines a converting weight of first prime color corresponding to a first prime color value, a converting weight of second prime color corresponding to a second prime color value, and a converting weight of third prime color corresponding to a third prime color value.

5. The identification method according to claim 4, wherein the gray levels corresponding to the plurality of gray-level pixels are obtained by summing up a product of the first prime color value and the converting weight of first prime color, a product of the second prime color value and the converting weight of second prime color, and a product of the third prime color value and the converting weight of third prime color.

6. The identification method according to claim 2, wherein the step of performing discrete cosine transformation on the gray-level source image to generate the at least one block transformation matrix further comprises steps of:
   dividing the gray-level source image into at least one gray-level block; and,
   performing discrete cosine transformation on each of the at least one gray-level block for respectively generating the at least one block transformation matrix.

7. The identification method according to claim 6, wherein the color source image comprises M×N pixels, and number of the at least one gray-level block and number of pixels contained in each of the at least one gray-level block are determined according to format of the discrete cosine transformation.

8. The identification method according to claim 7, wherein each of the at least one gray-level block respectively comprises 8×8 gray-level pixels if the format of the discrete cosine transformation is 8×8.

9. The identification method according to claim 2, wherein the step of obtaining the plurality of texture parameters according to the at least one block transformation matrix further comprises steps of:
   accumulating the at least one block transformation matrix to obtain an image transformation matrix, wherein the image transformation matrix comprises a plurality of accumulated converting values;
   dividing the image transformation matrix into a smooth texture area, a vertical texture area, a horizontal texture area, a slashed texture area, and a high-frequency area; and,
   obtaining the plurality of texture parameters according to the smooth texture area, the vertical texture area, the horizontal texture area, and the slashed texture area.

10. The identification method according to claim 9, wherein the plurality of texture parameters comprise a smooth texture parameter corresponding to the smooth texture area, a vertical texture parameter corresponding to the vertical texture area, a horizontal texture parameter corresponding to the horizontal texture area, and a slashed texture parameter corresponding to the slashed texture area.

11. The identification method according to claim 10, wherein the step of weighting the plurality of texture parameters and the plurality of color momentums to obtain the image identification parameter corresponding to the color source image further comprises steps of:
   weighting the plurality of texture parameters according to a smooth texture weight corresponding to the smooth texture parameter, a vertical texture weight corresponding to the vertical texture parameter, a horizontal texture weight corresponding to the horizontal texture parameter, and a slashed texture weight corresponding to the slashed texture parameter.

12. The identification method according to claim 11, wherein the smooth texture weight is maximum of the texture weights.

13. The identification method according to claim 9, wherein the at least one block transformation matrix comprises a plurality of converting values, and when the number of the at least one block transformation matrix is plural, the step of accumulating the at least one block transformation matrix to obtain the image transformation matrix further comprises steps of:
   summing up a converting value at a first position of a first block transformation matrix and a converting value at the first position of a second block transformation matrix;
   repeating the above process on converting values at the first position of each block transformation matrix; and,
   obtaining the image transformation matrix after repeating the above process on converting values at each position of each block transformation matrix.

14. The identification method according to claim 1, wherein the color source image comprises a plurality of color pixels and the step of proceeding color feature extraction on the color source image to obtain the plurality of color momentums comprises steps of:
   performing chromaticity conversion on the plurality of color pixels respectively to obtain a plurality of chromaticity pixels;
   mapping the plurality of chromaticity pixels onto a chromaticity plane;
   calculating number of the plurality of chromaticity pixels corresponding to positions on the chromaticity plane;
   defining a plurality of combinations of chromaticity densities; and,
   obtaining the plurality of color momentums according to the plurality of combinations of chromaticity densities and the number of the plurality of chromaticity pixels corresponding to the positions on the chromaticity plane.

15. The identification method according to claim 14, wherein the step of performing chromaticity conversion on the plurality of color pixels respectively to obtain the plurality of chromaticity pixels comprises steps of:
   providing a chromaticity transformation matrix; and,
   converting the plurality of color pixels represented by a prime color representation method into the plurality of chromaticity pixels represented by a chromaticity representation method according to the chromaticity transformation matrix.

16. The identification method according to claim 15, wherein the prime color representation method represents the plurality of color pixels with a first prime color value, a second prime color value and a third prime color value, and the chromaticity representation method represents the plurality of chromaticity pixels with a first chromaticity value, a second chromaticity value and a third chromaticity value.

17. The identification method according to claim 16, wherein the step of mapping the plurality of chromaticity pixels onto the chromaticity plane comprises steps of:
   representing each of the plurality of chromaticity pixel with a first normalized chromatic value and a second normalized chromatic value, wherein the first and the second normalized chromatic values are obtained according to the first, the second and the third chromaticity values of each of the plurality of chromaticity pixels; and,
   determining the positions of the plurality of chromaticity pixels on the chromaticity plane according to the first and the second normalized chromatic values representing each of the plurality of chromaticity pixels.

18. The identification method according to claim 17, wherein the step of representing each of the plurality of chromaticity pixels with the first normalized chromatic value and the second normalized chromatic value comprises steps of:
   obtaining the first normalized chromatic value representing a first chromaticity pixel according to the first chromaticity value of a first chromaticity pixel and summation of the first, the second and the third chromaticity values of the first chromaticity pixel;
   obtaining the second normalized chromatic value representing the first chromaticity pixel according to the second chromaticity value of the first chromaticity pixel and summation of the first, the second and the third chromaticity values of the first chromaticity pixel; and,
   repeating the above steps on each of the plurality of chromaticity pixels.

19. The identification method according to claim 18, wherein the step of representing each of the plurality of chromaticity pixels with the first normalized chromatic value and the second normalized chromatic value further comprises steps of:
   quantizing the first and the second normalized chromatic values representing each of the plurality of chromaticity pixels.

20. The identification method according to claim 18, wherein the step of obtaining the plurality of color momentums according to the plurality of combinations of chromaticity densities and the number of the plurality of chromaticity pixels corresponding to the positions on the chromaticity plane comprises steps of:
- adjusting powers of the first and the second normalized chromatic values corresponding to the positions on the chromaticity plane in response to each of the plurality of combinations of chromaticity densities; and,
- calculating products of power of the first normalized chromatic value, power of the second normalized chromatic value, and number of chromaticity pixels corresponding to the positions on the chromaticity plane to obtain the plurality of color momentums.

21. The identification method according to claim 1, wherein number of the plurality of color momentums is determined according to number of the plurality of combinations of chromaticity densities.

22. A non-transitory computer readable medium storing a software program, wherein when the software program is executed, an electronic device with a controller performs an image identification method comprising steps of:
- proceeding texture feature extraction on a color source image to obtain a plurality of texture parameters;
- proceeding color feature extraction on the color source image to obtain a plurality of color momentums;
- weighting the plurality of texture parameters and the plurality of color momentums to obtain an image identification parameter corresponding to the color source image; and
- adjusting weights corresponding to the plurality of texture parameters and weights corresponding to the plurality of color momentums according to size of the color source image.

* * * * *